United States Patent [19]
Lapeyre, deceased

[11] Patent Number: 5,289,394
[45] Date of Patent: Feb. 22, 1994

[54] POCKET COMPUTER FOR WORD PROCESSING

[75] Inventor: James M. Lapeyre, deceased, late of New Orleans, La., by Noreen B. Lapeyre, executrix

[73] Assignee: The Laitram Corporation, Harahan, La.

[21] Appl. No.: 29,948

[22] Filed: Mar. 9, 1993

Related U.S. Application Data

[63] Continuation of Ser. No. 672,756, Mar. 22, 1991, abandoned, which is a continuation of Ser. No. 453,179, Dec. 26, 1989, abandoned, which is a continuation-in-part of Ser. No. 92,372, Sep. 2, 1987, abandoned, and a continuation-in-part of Ser. No. 862,647, May 13, 1986, Pat. No. 4,891,777, which is a continuation of Ser. No. 528,975, Sep. 2, 1983, abandoned, which is a continuation-in-part of Ser. No. 493,613, May 11, 1983, abandoned.

[51] Int. Cl.$^5$ ................................. G06F 3/02
[52] U.S. Cl. ........................... 364/709.12; 364/710.14
[58] Field of Search .............. 364/709.12, 709.15, 364/709.16, 710.13, 710.14, 705.04

[56] References Cited

U.S. PATENT DOCUMENTS

| | | | |
|---|---|---|---|
| 3,967,273 | 6/1976 | Knowlton | 364/709.16 |
| 4,117,542 | 9/1978 | Klausner et al. | 364/705.06 |
| 4,237,540 | 12/1980 | Sato | 364/705.04 |
| 4,360,892 | 11/1982 | Endfield | 364/900 |
| 4,361,874 | 11/1982 | Yasuda | 364/710.13 |
| 4,385,291 | 5/1983 | Piguet | 364/709.15 |
| 4,444,520 | 4/1984 | Hanakata et al. | 400/88 |
| 4,531,194 | 7/1985 | Morino et al. | 364/705.04 |
| 4,555,193 | 11/1985 | Stone | 400/486 |
| 4,847,799 | 7/1989 | Morita et al. | 364/709.12 |
| 4,852,057 | 7/1989 | Patton | 364/709.06 |
| 4,891,775 | 1/1990 | McWherter | 364/705.06 |

FOREIGN PATENT DOCUMENTS 511240 8/1939 United Kingdom ........... 364/709.15

Primary Examiner—David H. Malzahn
Attorney, Agent, or Firm—Laurence R. Brown; James T. Cronvich

[57] ABSTRACT

Word processing in a pocket sized alphanumeric programmable computer is made possible by means of a self contained movable magnetic recording medium and a keyboard accomodating touch typing with as few as twelve keys operable for a wide range of alphanumeric and computer instruction entries. The keyboard thus takes up little room to share panel space with a visual display for generating temporary text being processed by the computer and therefore providing panel room for a multiple line alphanumeric display for recall and editing of text in the word processing mode of computer operation.

1 Claim, 9 Drawing Sheets

FIG. 3.

The Best Gidget Company, Eugene, Me.

XYZ Corp.  Sept. 18, 1986
1111 Able St.
New York, Ill.

Dear Customer,

We thank you for your current order of 24 Gidgets made to special order.
    Production is scheduled and you should receive delivery within the next three weeks.

Sincerely,

George Gares

POCKET COMPUTER FOR WORD PROCESSING

This application is a continuation of Ser. No. 07/672,756, filed Mar. 22, 1991 for Pocket Programmable Computer with Movable Magnetic Memory, now abandoned, a continuation of Ser. No. 07/453,179 filed Dec. 26, 1989, now abandoned, which is a continuation-in-part of both Ser. No. 07/092,372 filed Sep. 2, 1987 for Portable Computer with Large Screen Display, now abandoned, and Ser. No. 06/862,647 filed May 13, 1986, now U.S. Pat. No. 4,891,777, Jan. 2, 1990, a continuation of Ser. No. 06/528,975 filed Sep. 2, 1983, now abandoned, which is a continuation-in-part of Ser. No. 06/493,613 filed May 11, 1983, now abandoned.

TECHNICAL FIELD

This invention relates to pocket sized programmable alphanumeric electronic computers, and more particularly it relates to pocket sized computers with self contained movable magnetic storage means and accompanying visual display means for presenting a multiplicity of lines of alphanumeric data for forming at least a multiple word sentence from a document being processed by the computer in a word processing mode.

BACKGROUND ART

Pocket sized portable computer systems are disclosed in these parent applications which can process alphanumeric information as well as many different computer commands from a keyboard having only twelve to sixteen keys. That is achieved by providing several modes of operation of the keys in the keyboard, typically a single stroke per entry decimal calculating mode, and a two key stroke per entry alphameric data processing mode which incorporates a significant number of computer commands. These parent applications have taken a direction contrary to the art in reducing the number of keys on a computer keyboard without the sacrifice of the wide range of operations that the computer can perform.

One feature of the parent application Ser. No. 07/092,372 now U.S. Pat. No., is the provision of a large display screen on a pocket sized computer, made possible by the reduction of the number of keys required on the keyboard. A typical prior art example of a small portable programmable computer attempting to provide a large screen, but being limited by the necessary forty five keyboard keys is the "Casio fx-7000 G" scientific calculator. Thus, the display screen occupies less than one-third of the front panel surface area.

There is no known portable pocket sized programmable computer having word processing capability or self contained movable magnetic storage means. The large number of keys heretofore required for processing alphanumeric data in word processors, such as typewriter type keyboards generally have in excess of thirty six keys in order to process the entire alphabet, numerical digits and computer commands.

Recent advertisements identify the introduction of a pocket computer for storing memos and providing several lines of alphanumeric display as the "Sharp Wizard". In order to provide even the limited display of several short lines of alphabetic data in a memo, this computer requires eighty five keys distributed over a first panel with the display screen and a further hinged keyboard panel with a set of alphabet keys, etc. Even so, this computer apparently is incapable of full scale word processing capabilities without swapping data with desk sized computers, and is limited to operation with the limited internal storage capacity of the electronic computer.

There have been suggestions in the prior art that tape recorders be associated with computers in desk top assemblies, as for example in M. Sato U.S. Pat. Nos. 4,120,037, Oct. 10, 1978 and 4,237,540, Dec. 2, 1980. There are no integrated relationships between computer operation and the tape recorder in this type of art, nor is there any suggestion that tape recorders are to be integrated into pocket sized comprehensive alphanumeric data processing systems.

However, there has been no capability demonstrated in the prior art in pocket sized subcompact computers to incorporate movable magnetic recording means that interchanges program and data with the computer or to provide keyboards capable of alphanumeric operation in the touch typing mode. Such features are critical to word processors. There are no known such prior art computers capable of incorporating word processing programs such as those currently available in desk top and lap top sized computers. In particular, the prior art has been substantially limited to the provision of a full typewriter type keyboard for any word processor versions of the computer arts.

Accordingly it is a primary objective of the present invention to provide practical word processing capabilities in subcompact pocket sized computers.

Another critical necessity for practical programmed word processing computers is the capacity to carry storage of computer generated data far in excess of that storable in the computer dynamic memory system. This is conventionally done by movable magnetic media such as discs and tapes that interchange data and programs with the computer.

Thus a further object of this invention is to provide a subcompact pocket sized computer with movable magnetic recording means controlled by the computer and computer keyboard for interchanging data and programs with the computer.

Further, it is an objective of this invention to provide programmable pocket sized electronic computers with enlarged electronic display panels affording with associated computer capabilities the capacity to display alphanumeric data for word processing.

It is a further objective of this invention to provide in such compact alphanumeric keyboard controlled computers the increased capacity for programming and storage of processed and pre-stored data by means of movable magnetic storage means.

Other objects, features and advantages of the invention will be found throughout the following description, drawings and claims.

BRIEF DESCRIPTION OF THE INVENTION

A programmable portable electronic computer housing has a front panel sharing a keyboard and display panel with the keyboard section having few keys, yet capable of processing alphanumeric data, thereby taking up so little of the area of the front panel that a large screen display is feasible for multiple line alphanumeric display making feasible comprehensive word processing capabilities with editing and review of stored data. In order to provide a larger screen area in a pocket sized portable computer, the keyboard is limited typically to twelve or sixteen keys. These keys provide for entry of both arithmetic and alpha data as well as a large inventory of computer commands.

The decreased number of keys permitting manual entry without crowding the finger space available is achieved by the data entry configurations of the parent applications hereto, namely the entry of alpha data and computer commands by the use of more than one key being stroked. Thus, the keyboard is operable in a touch typing mode with the fingers on a single hand.

The computer includes movable magnetic storage means, such as a tape or disc recorder, for integrated use with the computer for interchange of data, the provision of programs for the computer and for word processing purposes such as storage of digital data. It can also store programs or data removed from the computer memory in such format for communication with other computers. Furthermore a tape recorder may be used for dictation of oral data in a dictation mode under control of the same keyboard as the computer.

One feature of the invention is to use the keyboard keys for a variety of different modes, such as a dictation mode, a word processing mode, a numeric mode with decimal digits entered by a single keystroke, and an alpha mode with alphabetic characters entered by two successive mutually exclusive keystrokes.

Another feature of the invention is that it may comprise a self-contained printer for viewing or output production of documents produced by the word and data processing facilities.

It is significant that the comprehensive pocket sized data processing system afforded by this invention incorporates movable magnetic recording means integrated for exchange of digital data with the data processing means to convey programs, documents, and even dictated messages with tape records so that the system has substantially the full capabilities of former systems of the desktop variety.

BRIEF DESCRIPTION OF THE DRAWINGS

Throughout the various views of the accompanying drawing similar reference characters identify similar features for ready comparison. The invention is set out in its preferred embodiment form, as follows:

FIG. 3 is a sixteen key version of the computer shown with alphanumeric word processing data on the oversized display screen.

THE PREFERRED EMBODIMENTS

Figure 1:
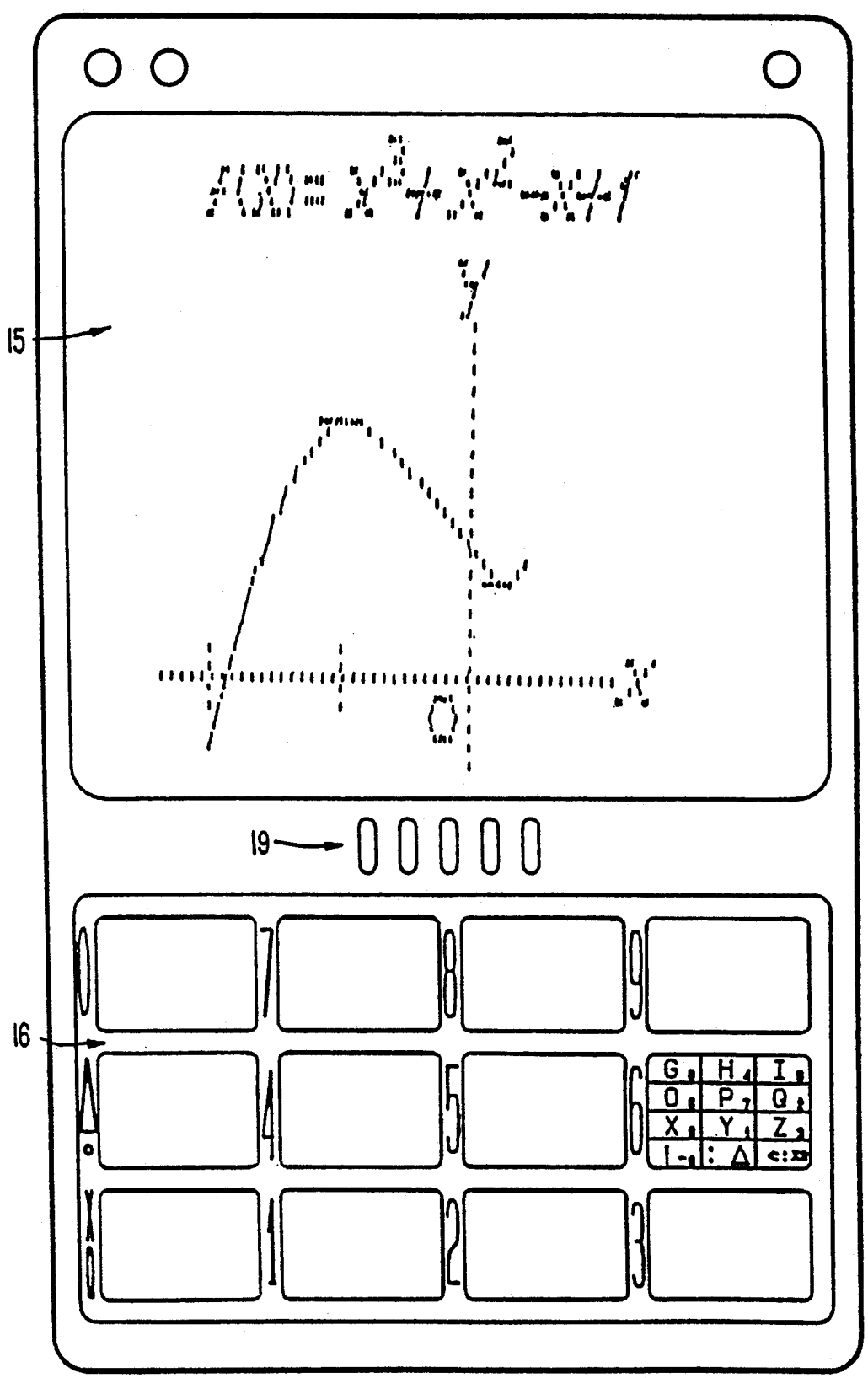
FIGS. 1 and 2 show respectively in front and side panel view a pocket sized computer embodiment having twelve keys and an oversized display area capable of graphic illustration.
Figure 2:
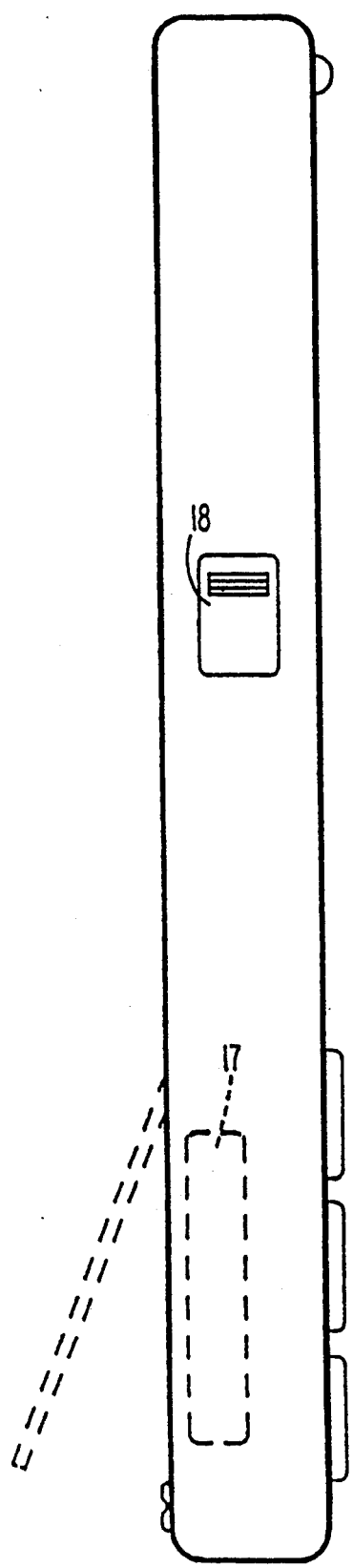

As may be seen by reference to FIGS. 1 and 2, a pocket sized computer is afforded by this invention wherein the display area space 15 is not limited significantly by an excessive number of manually operable keys, and thus constitutes most of the shared front panel space partly taken up by the twelve key keyboard section 16.

The graphic display on the screen 15 includes not only space for an enlarged graph in great detail, but also has the corresponding alphanumeric notation therealongside. This panel space could not have been available on a pocket sized portable computer from a keyboard of the typewriter character, which would take up much more room than the twelve keys provided. Also this invention provides keys large enough for comfortable and accurate manual entry to be manipulated by an operator's fingers in a touch type mode if desired.

It has been possible therefore to reduce keyboard panel space and enlarge display panel space by use of a twelve key keyboard having alpha capabilities. This is achieved by entering the alphabet characters, for example, by means of two keystrokes per character. As indicated in the parent cases, this technique will provide for 144 choices from twelve keys so that there will be room for up to about one hundred computer commands to be selected from the set of twelve keys. Thus the reduction of numbers of keys in no way limits the capabilities of the keyboard to operate the computer fully.

It may be seen from the keyboard that the twelve keys are designated by notation to the left of the key indicating the ten numeric digits (0 to 9), an execute key (XQ) and a decimal point key. The latter key serves a dual function as an "enter" key signified by the arrow so that when the second decimal point occurs in any entry, such as a multidigit decimal word, or such as in two successive decimal point strokes, an entry of the preceding information occurs. See my U.S. Pat. No. 4,567,567 Jan. 28, 1986 in this respect. The computer operates in the conventional manner of serially entering digits or characters until an enter command occurs.

Figure 4:
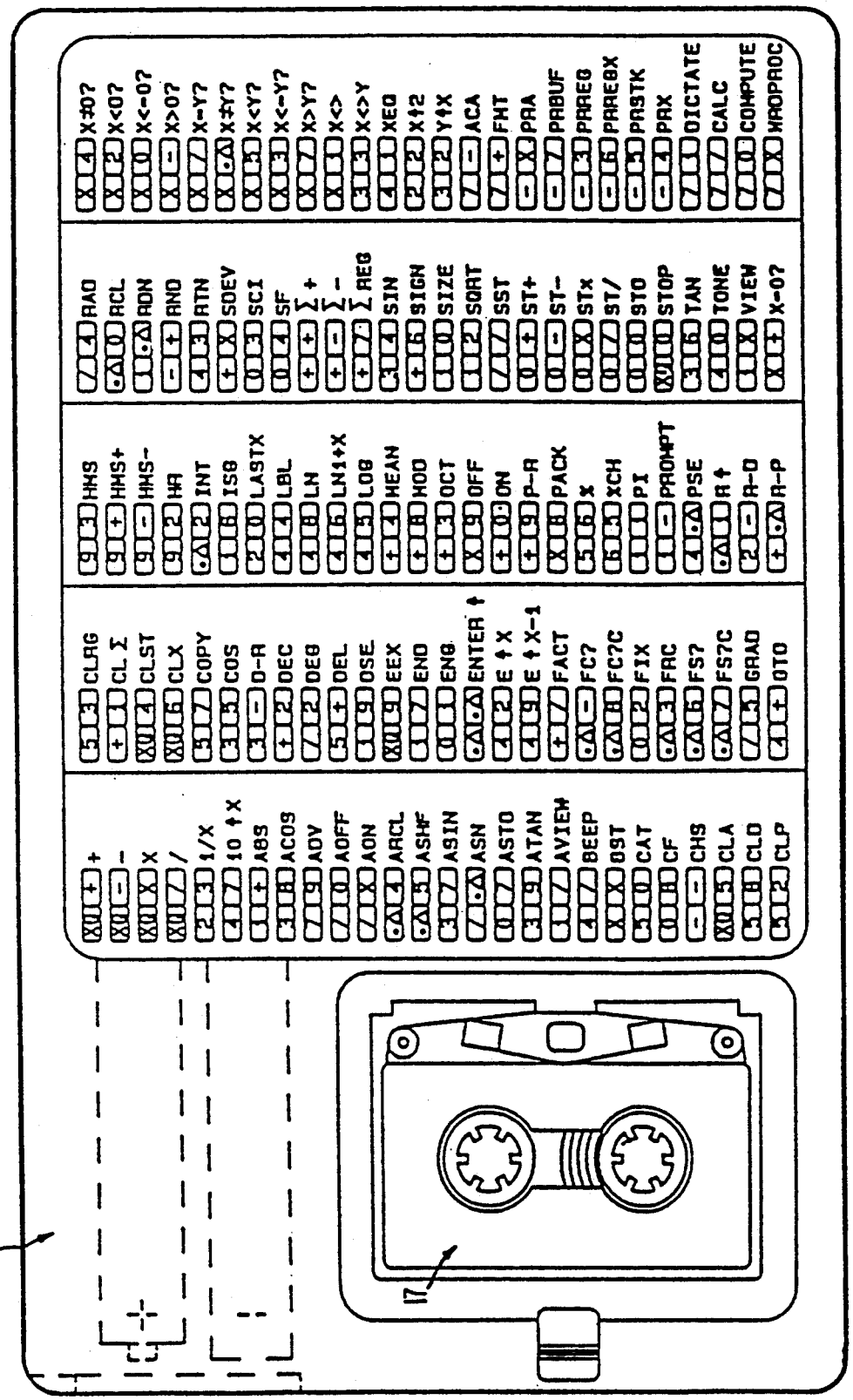
FIG. 4 is a back panel view showing additional keystroke instructions for functions not identified on the keys of the front panel, and an incorporated tape cassette used for digital communications with the computer and for oral dictation purposes.

Also it may be observed that on each key is a chart listing a set of twelve functions initiated by that key and identifying the second keystroke in the sequence to complete the designated entry. Thus to enter A for example keys 4-5 are stroked in sequence as indicated by the A5 notation in the upper left hand corner niche of the "4" key. Similarly the decimal digit "1" is entered in this embodiment by the two stroke sequence of the decimal point key and the "1" key, hence the 1—1 notation. It is also possible to program the keys for other functions than displayed. For example if only numeric calculations are desired, then a "decimal" mode could be chosen wherein at least ten of the twelve keys can be made "live" for single stroke entry of the decimal digits to save key entry time. Other such modes may be chosen such as a "dictate" mode to be discussed hereinafter wherein the keyboard keys are adapted to the control and use of the internal movable tape cassette 17, microphone 18, and replay speaker 19 for the functions normally expected for dictating purposes by means of key stroke control entries. These entries may of course be a portion of the 144 available functions with two strokes and twelve keys, if they are not allocated for other purposes. The functions available are shown in abbreviated format such as "word proc" for the word processing mode obtained from the XQ-1 keystroke sequence. Other functions or selections or modes may be shown in the additional chart area on the back panel as shown in FIG. 4 wherein the two keystrokes and command, mode selection, character for other computer functions are identified.

As may be seen from FIG. 3, the enlarged screen area of display section 15' is sufficient to provide for multiple line alphanumeric displays. This is particularly useful for word processing and makes it feasible to incorporate word processing into a pocket sized programmable electronic computer. Such documents as displayed upon the screen 15' are created by the computer in response to manual information entered into the computer from the keyboard 16'.

The keyboard keys control the various functions related to word processing from stored program materials in the computer in the manner described in the parent cases using the keyboard keys for the various controls as well as for data input. The movable magnetic medium recording means is also controlled by the computer and the keys to store the documents in digital form. Thus the tape recorder is used in different modes such as "dictation" and "word processing" to produce a versatile capability in a pocket sized portable computer comparable to that attainable in personal computers, and can additionally serve as an oral communication medium for dictation and the like, in a dictation mode of operation where essentially the tape recorder is controlled by the keyboard rather than the computer.

Figure 5:
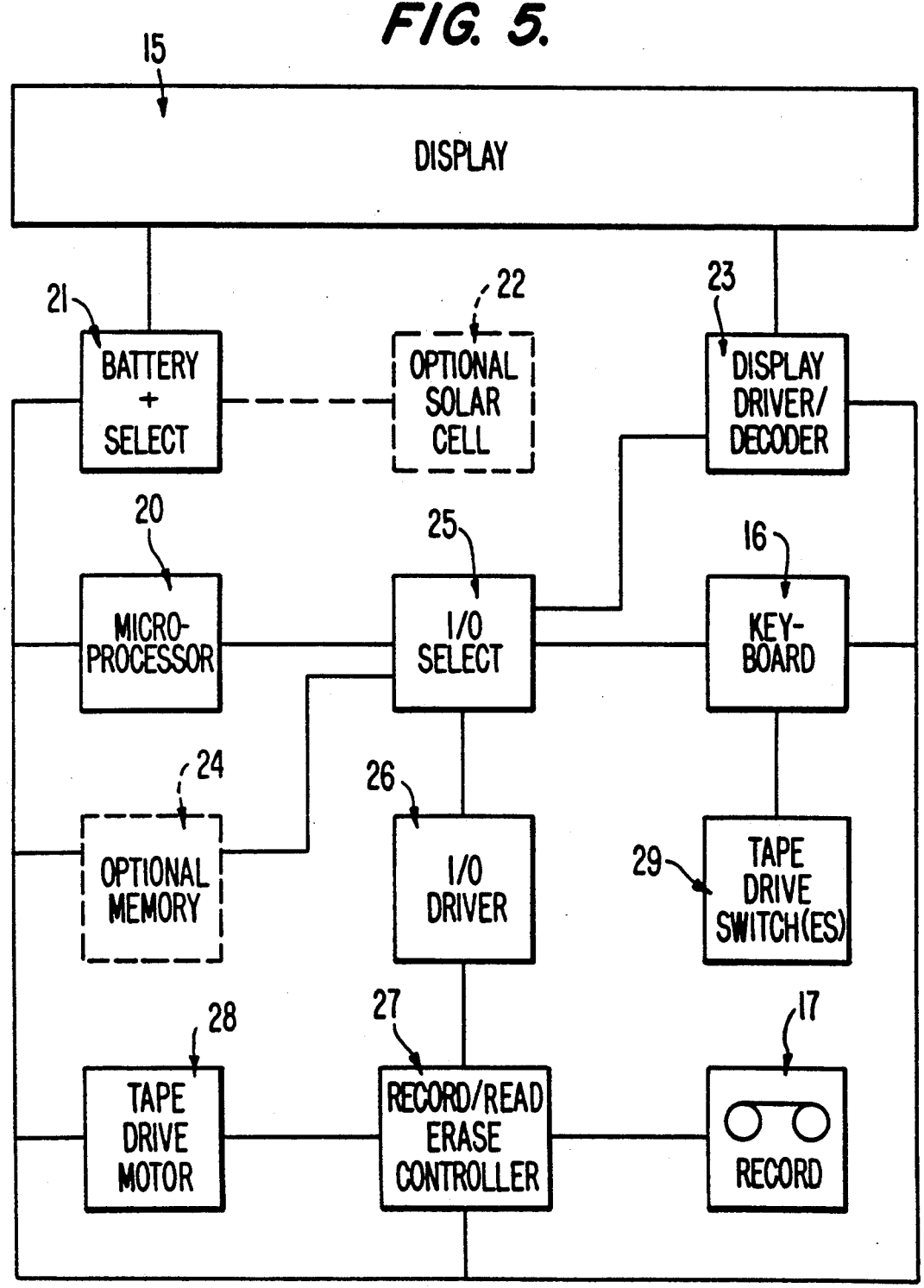
FIG. 5 is a block diagram sketch of the overall computer data flow through the usual computer sub-system portions.

The operating system is shown in block diagram form in FIG. 5 relating the keyboard 16, display screen 15 and movable tape recorder 17 to the computer microprocessor 20. This portable pocket sized system is powered by batteries 21 and/or the equivalent solar cells 22. The screen graphical or alphanumeric message is supplied by means of the driver-decoder 23, which works in conjunction with the computer 20 to organize and display information using whatever memory facilities are available and required in the computer 20 and the driver-decoder section 23. Optional further memory 24 may be incorporated, for example to receive and store information from the tape recorder 17 for word processing and/or display on the screen 15.

The input/output control section 25 coordinates the various sources and depositories of information and control commands whether they come from the keyboard 16 or computer 20. The interfacing driver 26 to the movable tape unit 17 permits the tape control section 27 to operate the tape drive motor 28 and the recording or reading functions of the tape recorder 17, such as interconnection of microphone, speaker and connections to memory or computer. Control of the tape through section 29 is coordinated with the keyboard 16, which also controls the associated word processing and computer command functions, so that in the "word processing" mode the system functions in a corresponding manner to state of the art word processors in personal computer sized console systems, for example.

Figure 6:
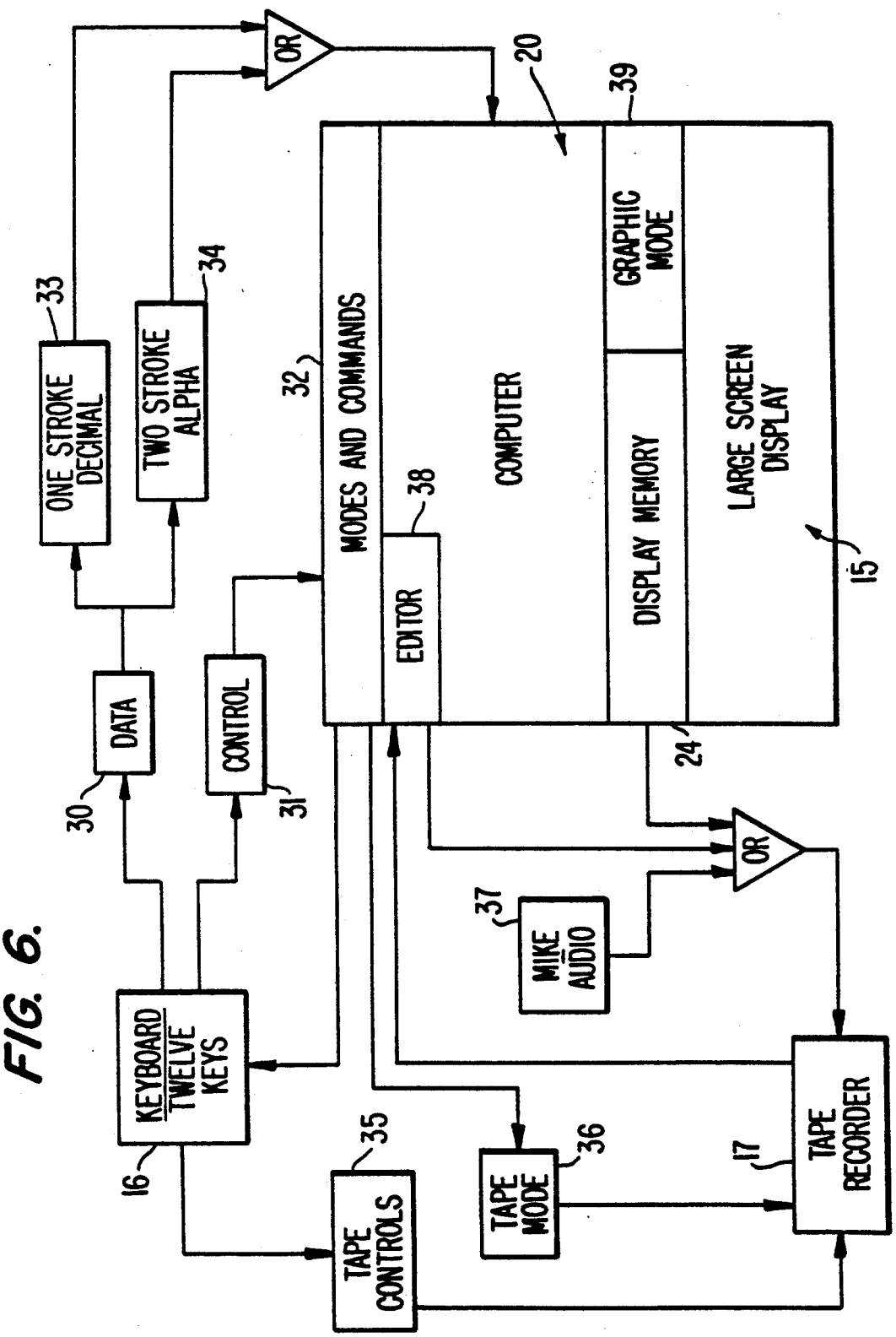
FIG. 6 is a block functional control diagram of a computer constructed in accordance with this invention.

FIG. 6 supplements the control functions just described with its data flow block diagram system relating to the keyboard 16, tape recorder 17 and computer 20.

Data 30 and control commands 31 are both derived from the keyboard to supplement whatever data and commands are contained in the computer software, storage and command processing structure. Thus the keyboard entries may through the computer system modes and commands processing section 32 control the function of the keyboard 16 itself to reorient the keys for different modes of operation.

As aforesaid, two different modes might be a one stroke per entry decimal mode of operation (33), which initiates the entry and flow of data, and a two stroke per entry alpha and computer command mode (34) which initiates both the entry and flow of data and the flow of command signals to the computer system. A third mode as previously discussed might be the word processing or tape modes (36) wherein the keyboard controls all the normal functions of word processing including the tape drive control functions (35) hereinbefore described, either directly through the keyboard or as programmed by suitable computer software. In this respect the tape recorder 17 is operable either from a microphone or other audio source (37), the computer editor section (38) or from computer storage. Word processing information available on the display screen 15 may be contained explicitly in a display memory section 24, which may include graphs formulated in the graphic mode of computer operation (39).

It is seen therefore that this invention provides a portable computer with large screen capability which is made possible by interaction of various system features. In this interaction the ability to provide comprehensive control of alphanumeric information and a large number of computer commands from very few keyboard keys, such as twelve or sixteen, is critical to the provision of a large enough display screen on a pocket sized programmable computer to process graphical displays and enough text presentation to make feasible word processing and other data handling features not heretofore feasible on such computers, such as dictation and storage of considerable quantities of both digital and oral data that is processed.

Other features are made possible by this invention such as the storage of computer software programming in the movable magnetic storage medium for such purposes as word processing and special computer programs that are of interest to the user. The use of the computer in either an oral dictating mode or a word processing digital mode provides a system capability not heretofore available in portable pocket sized computer systems. Portable pocket sized computers heretofore have required too many keys to provide for alphanumeric operation and full range of computer capabilities to be able either to afford large display screen areas, and the possibility of touch typing in the comprehensive range of computer capabilities made available by this invention.

Figure 7:
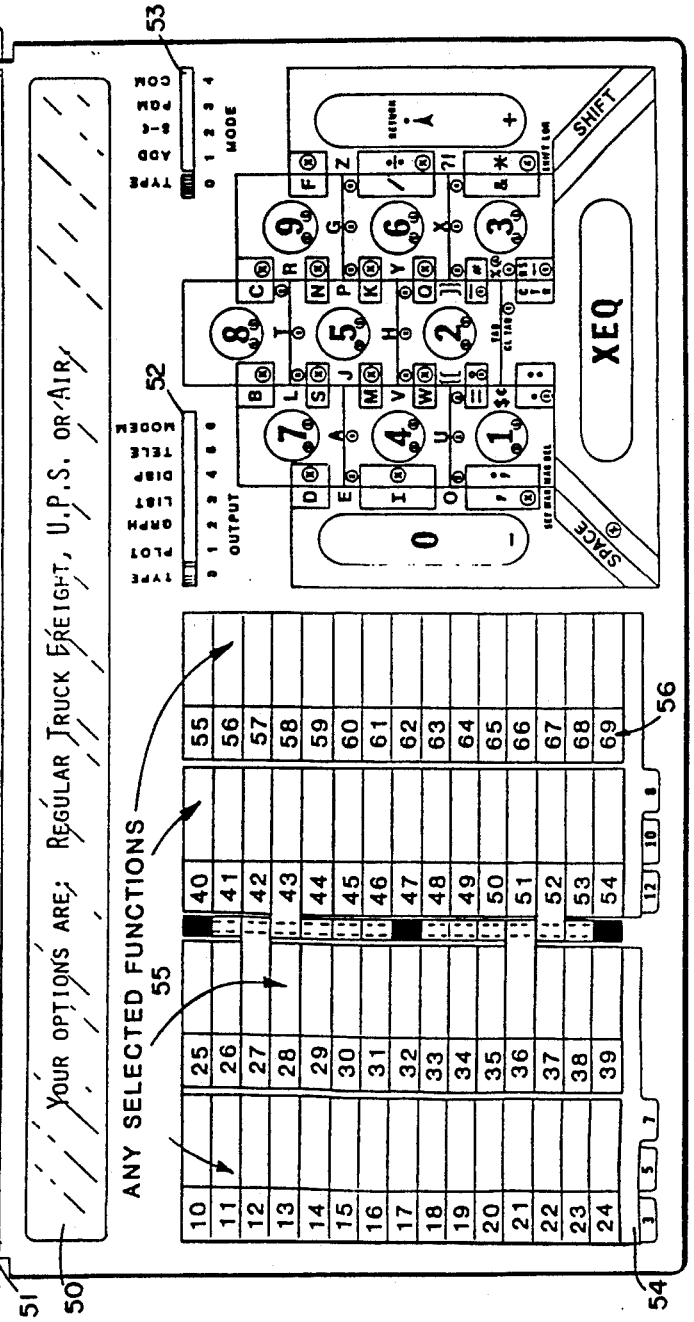
FIG. 7 is a front panel view of an embodiment of the invention with a self contained printer disposed along the longer rectangular dimension of the pocket sized computer for printout of documents processed in the computer.
Figure 8:
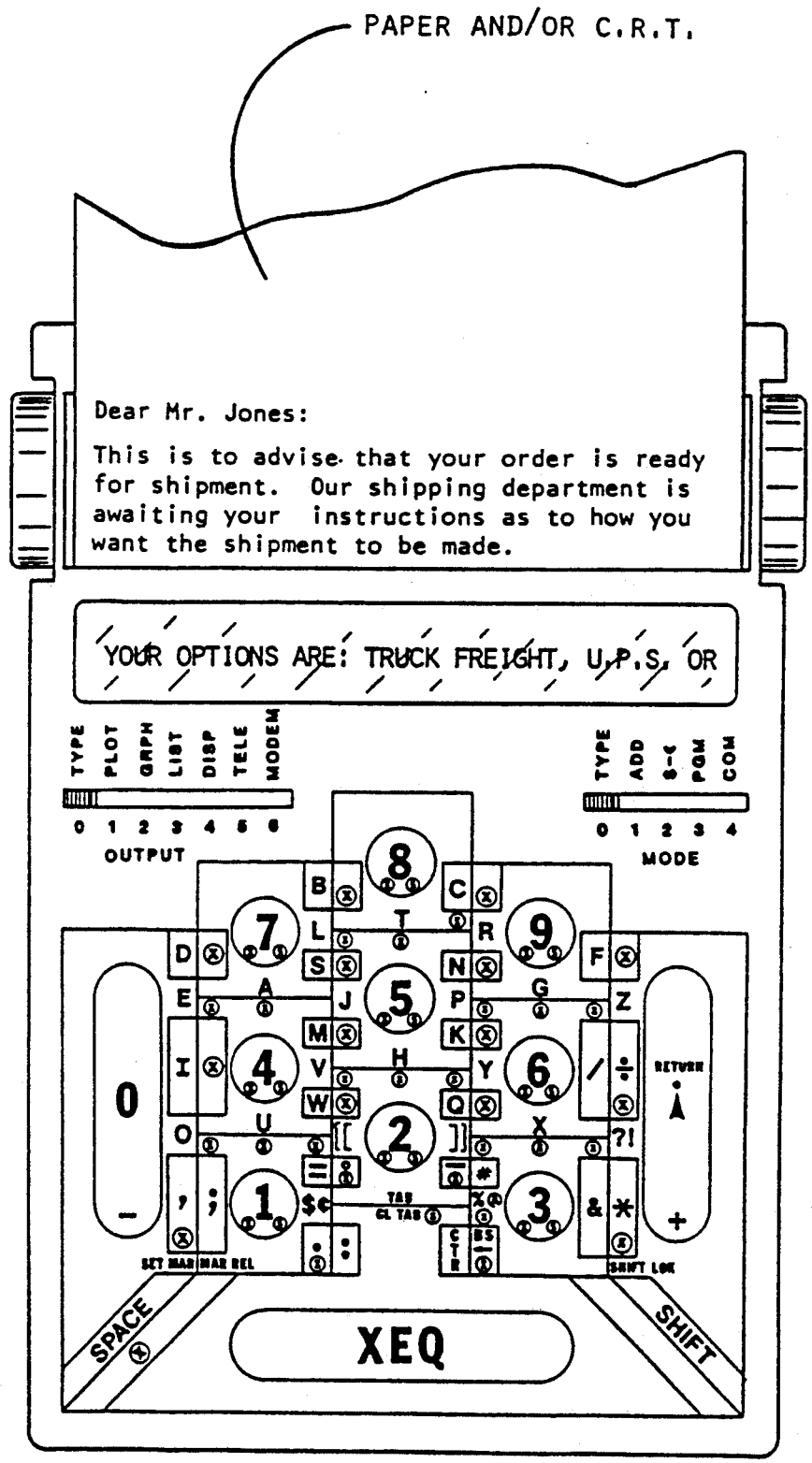
FIG. 8 is a similar front panel view with the printer disposed along the shorter rectangular dimension of the computer housing.

As may be seen from FIGS. 7 and 8, the keyboard may take another configuration, and printer output means may be included in the pocket sized data processing system. As many as about one hundred and fifty selections may be made from the twelve keys of this single hand touch type format keyboard. The twelve basic keys provide for the numeric digit entries as well as a pair of command keys for executing computer commands. The table 55 may in each of several selected modes 54 provide coded two stroke entries 56 for entering computer instruction functions and subprograms supplemental to those entries identified on the keyboard notation. Both the computer generated temporary display 50 and the printed output 51 is available as output media in accordance with computer controls. Various modes of computer operation are selectable 52, 53 by separate switches or by means of coded functions on the chart 55. Twelve single keys are arranged in columns of offset side by side keys to form a configuration and spacing conforming to the shape of a human hand for facilitating touch typing. In addition to the twelve single keys, other entries are made from "virtual" keys by the concurrent selection of two or more of the twelve keys with a single fingerstroke. Also the shift key in the usual way will change the functional performance of the keys for a different mode or choice of entries.

The printer aspect ratio, as placed along the major dimension of the usually rectangular housing of the pocket sized computer is a feature of the FIG. 7 embodiment. That is an advantage particularly adapted to word processing where documents may be produced in the field. Also the longer lines of alphabetic characters on the screen 50 permit the format to be substantially consistent with business document messages.

Figure 9:
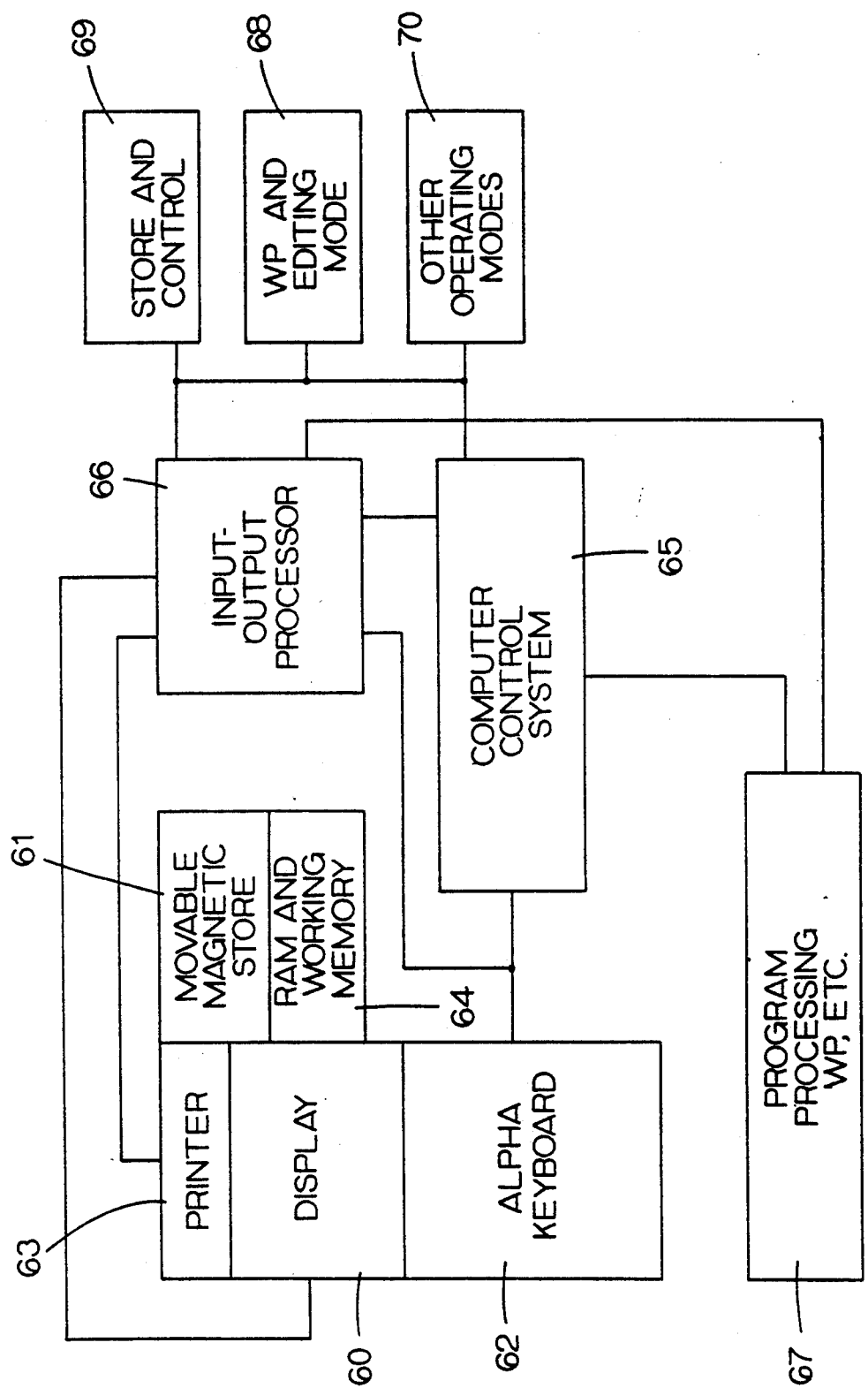
FIG. 9 is a block system diagram of the comprehensive programmable alphanumeric pocket sized data processing system afforded by this invention.

At this stage of the general purpose programmable computer art, well developed in table top personal computers for example, various functions and computer system interrelationships may be established by programming the computer. Thus, to organize a system operable in the manner shown in FIG. 9 is well within the ordinary skills of those in the art, provided all the components are available in the system. At least two of the features are unusual in the pocket size computer arts to which this invention is directed. One of these features, namely a large enough multiple line alphanumeric temporary computer generated display screen 60 is critical to the display and editing of text in word processing applications. As aforesaid, this large screen feature is feasible with this invention only because of the ability to operate the computer comprehensively and alphabetically with very few finger sized keys spaced apart for touch typing on a keyboard 62 sharing panel space with the computer display means 60. Another such feature is the unique presence of a movable magnetic storage medium 61 in a pocket sized computer, that communicates in various languages including digital computer coding, and has storage facilities for computer programs, data bank materials and documents prepared from the keyboard in a data processing mode. Also preferably the movable magnetic store 61 is compatible with other computer systems for interchange of programs and data.

Printers 63 are known, but the printout of documents prepared in situ on a keyboard controlled pocket sized computer operable in the data processing mode is a feature of this invention.

The usual RAM and working memories 64 of the computer system are provided in the operational system of the computer, and are controlled by a computer control system 65 and input-output processing means 66 conventional in general purpose computer systems. Also communications between program processing means 67 common in general purpose programmable computers and the various operating systems is well known, as is the establishment of a word processing mode 68 of computer operation by employment of a suitable program usually obtained from a movable magnetic storage medium and transferred temporarily into the RAM or working memory 64 of the computer, when operating in that mode.

Sub-operating modes such as word searching, dictionary comparison, and thesaurus organization of related words, 69 are now feasible when adequate movable magnetic storage is available. This is a common feature in many large desk top word processing systems, but in the pocket sized computer of this invention is only feasible with the large screen display 60 and the movable magnetic store 16 being available. Thus, the stored dictionary words and thesaurus means in the computer for organizing related words found in the dictionary are displayed on the multiple line alphanumeric display 60 by means of suitable program control means such as that used for similar features in larger computer systems. Various other programmed operating modes 70, such as graphics, numeric calculations etc., also may be enhanced by either or both the movable storage medium 61 and the large temporary computer generated screen area 60 available in accordance with this invention.

The primary objective of providing and operating a word processing system in the pocket sized computer arts is now discussed in more detail. Miniaturization of desk top computers into the lap-top size is now conventional, wherein generally an almost full sized typewriter keyboard and separate full panel screen are employed. Such is not feasible in pocket sized computers, since those key features for word processing are not in the usual sense miniaturizable, as are the electronic system components of the general purpose programmable computer. The problems of the number of keyboard keys as overcome by this invention are adequately set forth hereinbefore, together with the attendant feature of the larger multiple line temporary computer generated screen thereby made possible. Thus, the miniaturization of movable magnetic means compatibly with pocket sized computers has been a critical development not long available in the computer arts. However, high density recording and reading from tapes or discs is developed to the extent that incorporation in the pocket sized housing of a general purpose computer is now achieved by this invention by unique system combinations working in a manner that permits a significant advance in performance of such functions as word processing.

A word processor must work with alphabetic characters enterable from a manually controlled keyboard. This has led to substantially universally accepted typewriter sized and styled keyboards for word processors, which by definition eliminate the possibility of word processing in a pocket sized general computer. Also, for editing and reviewing, many alphabetic lines of data must be available for recall and display on a screen visible while the keyboard is being used and text is being manipulated, recalled, created, checked for language and spelling, and stored.

Accordingly now this invention makes available a pocket sized word processing computer system available for the first time. Those novel features of the invention are defined with particularity in the following claims believed to address the spirit and scope of the invention.

I claim:

1. A pocket sized, keyboard controlled, programmable, alphanumerical computer comprising in combination: a self contained movable magnetic storage medium controlled by computer derived control signals, an internal operating memory, program responsive means in said computer for operating said computer in a mode for interchanging information between said magnetic storage medium and said internal operating memory of said computer to interchange data and control instructions between the computer and movable magnetic medium, a set of keyboard keys on a computer panel coupled with computer control means for controlling said magnetic storage medium and for independent keyboard entry of alphanumeric data and control instructions for processing in said computer, said set of keyboard keys having less than seventeen keys and means for operating said computer in an alphabetic mode of operation from the keyboard, wherein alphabetic characters are enterable from said set of keyboard keys by a sequence of two successive keystrokes, visual display means sharing said computer panel with the keyboard keys for presenting computer generated alphanumeric data in a multiple line format of at least three lines, means for storing a set of dictionary words in said computer, thesaurus means for organizing set of related words from said dictionary words, and means operating said computer from said keyboard keys in a mode for displaying said related words on said visual display means in response to entry of a reference word in said dictionary from said keyboard.

* * * * *